April 14, 1959 J. R. MACDONALD 2,882,465

TRANSISTOR

Filed Dec. 17, 1957

INVENTOR

*James R. Macdonald*

BY *Stevens, Davis, Miller & Mosher*

ATTORNEYS

United States Patent Office 2,882,465

Patented Apr. 14, 1959

2,882,465

TRANSISTOR

James Ross Macdonald, Dallas, Tex., assignor to Texas Instruments Incorporated, Dallas, Tex., a corporation of Delaware Application December 17, 1957, Serial No. 703,394

8 Claims. (Cl. 317—235)

This invention relates to a new transistor structure having two or three base electrodes and is usable either as a high frequency amplifier, a power amplifier, or a modulator depending upon how it is biased and connected.

Briefly, the invention comprises a transistor having conventional emitter and collector electrodes. One of the base electrodes of the transistor penetrates one of the outer semiconductor layers to contact the base which is sandwiched between the emitter and collector layers. This electrode makes ohmic contact with the base but makes rectifying contact with the outer layer penetrated by it. An annular conducting ring extends around the perimeter of the base layer of the transistor and makes ohmic contact with the base layer. This ring is split into two semicircular sections to form the second and third base electrodes.

Prior to the present invention it was known to use an annular electrode surrounding the base layer. It was also known to use an outer layer penetrating base electrode to make ohmic contact in the center of the base layer and rectifying contact with the outer layer. It has furthermore been known to use two base electrodes separately placed upon the base layer. The present invention presents a combination of an outer layer penetrating base electrode and a base electrode surrounding the base layer and this combination results in a device which has a multiplicity of utilities. When it is used in one mode of operation there is a great reduction of noise and surface leakage and the parameters of the device are unlikely to change with time. When used in another mode of operation, the unit is suitable for appreciable power amplification. Furthermore, the device can be used as a modulator or for automatic gain control.

The objects and advantages of the present invention can be better understood from the description with reference to the drawing wherein.

Figure 1:
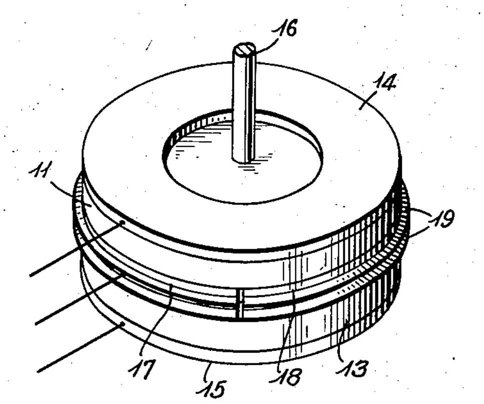
Figure 1 shows an external view of the transistor structure.
Figure 2:
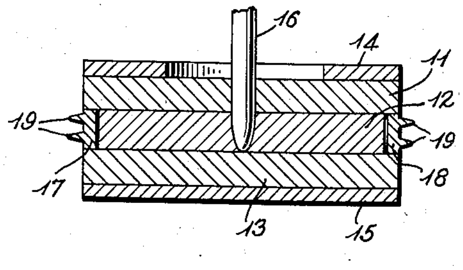
Figure 2 shows a cross sectional view of the transistor structure.

The transistor may be a grown, diffused, grown diffused or other junction type transistor and has a thin emitter layer 11, a collector layer 13, and a base layer 12 sandwiched between the layers 11 and 13. In the preferred embodiment the structure is cylindrically shaped but may have a square or any other cross section configuration. A ring shape conductor 14 constitutes the emitter electrode and this electrode makes ohmic contact with the emitter layer 11. Such a contact may be affixed to the emitter as by soldering or alloying, for example. A disc shaped collector electrode 15 makes ohmic contact with the collector layer. The collector contact may be affixed to the unit in the same manner as is the emitter. The emitter and collector electrode may be of any suitable material, such as, for example, gold plated tungsten or copper.

A conductor 16 passes through the opening in the electrode 14 and through the thin emitter layer 11 making rectifying contact therewith and into the base layer 12. This conductor preferably, although not necessarily, passes entirely through the base layer making ohmic contact throughout the width of the layer and makes a rectifying contact with the collector layer 13. This conductor constitutes one of the base electrodes. The preferred method of making a base contact of this type is by a bonding or alloying technique. This technique consists of contacting the thin emitter layer with a wire made from one of the so called active impurities, that is, impurities strongly affecting the conductivity type of the semiconductor causing it to become either P or N, or with a wire made from a reasonably inactive impurity, such as gold, which is either alloyed with or coated with one of the active impurities. If the emitter layer is of N type semiconductor material, the active impurity of the wire should, of course, be one of the P type impurities, such as indium or aluminum for example, to produce a rectifying contact to the emitter and an ohmic contact to the base. If the emitter region is of P type materials, the base contact should, of course, contain N type active impurities. After the wire is brought into contact with the emitter region the device is heated until the tip of the wire melts and alloys with or is bonded to the device. When the device is cooled a small region of the emitter material directly adjacent the contact will have been converted to an opposite type conductivity or the same type conductivity as the base and this converted region will extend from the contact wire to the base region providing ohmic contact thereto. Ohmic contact throughout the width of the base layer by this central conductor is preferable as noted above in order that bias currents flowing between this conductor and the peripheral base contacts, which will be described subsequently, will not be restricted to flow in only a portion of the base width in the area around the center base conductor. Better control is afforded when these base bias currents are allowed to flow through the entire width of the base layer over the full distance from the peripheral contacts to the central base contact.

The other base electrodes are formed from a conducting annular ring which is split into two semi-circular sections 17 and 18. These semi-circular sections surround the base layer and make ohmic contact therewith. They may overlap the emitter layer 11 and the collector layer 13 provided that they make rectifying contact therewith. Such "ring" contacts to the base layer may be provided by selective plating techniques now well known in the art where the exposed regions of the base layer are plated with a highly conductive material which preferably contains an active impurity of the same type present in the base region. The unit may then be etched to insure that none of the plated material remains in contact with either the emitter or collector regions to short circuit these regions to the base; or the unit may be heated sufficiently to alloy the plated material to the bar, thus producing ohmic contact to the base region and rectifying contact to the emitter and collector regions, due to the active impurity content of the plated material, should there be any "slop-over" of the plating to these regions. Heat dissipating fins 19 may be formed around the outside of the sections 17 and 18. The unit thus has 3 base electrodes, the sections 17 and 18 and the conductor 16, and comprises a pentode. The device can be operated as a tetrode by connecting together the sections 17 and 18. If the device is to be operated as a tetrode, it is not necessary for the sections 17 and 18 to be separated but may be combined into one continuous ring.

There are several possible modes of operation of this structure. If the device is operated as a tetrode with these two sections 17 and 18 connected together and a bias of the proper polarity is applied between the outer ring base contact and the center base contact 16, the emitter-collector current flow will be constrained to flow only in the immediate neighborhood of the center base wire 16. Operation will then be like that of an ordinary two-base tetrode but improved because the radial symmetry will give better field conditions and hence better tetrode control and no emitter-collector current flow will take place near a free surface of the transistor. All such flow will be constrained to occur deep in the bulk of the transistor. This will result in almost a total elimination of surface recombination effects and will practically free the operation of the unit from the influence of surface conditions. As a result the noise and the surface leakage of the unit will be reduced and the parameters of the unit will be less likely to change with time.

Another mode of operation of the unit as a tetrode is with the bias between the center base contact wire 16 and the outer ring contact reversed from that described above. The emitter-collector current flow will then be constrained to take place just inside the outer radial base electrodes comprising the sections 17 and 18. Since the contact area of the sections 17 and 18 is of considerable size the effective base resistance will be greatly reduced to as low as an ohm or less. The unit will then be suitable for appreciable power amplification. The major portion of the heat is then dissipated near the base contact sections 17 and 18 and the heat dissipating fins 19 help maintain the unit at an operable temperature.

According to another mode of tetrode operation one signal is applied to the center base electrode 16. Then when a bias or another signal is applied between this electrode and the outer surrounding electrode comprising the sections 17 and 18, very great and sensitive control of the emitter-collector current-flow can be achieved. Automatic gain control or modulation is thereby possible. The emitter-collector current can be varied by a factor of 100 by this method. The greater degree of control arises from the radial symmetry of the unit. Initially with no base to base bias the emitter-collector current flow is more or less uniformly distributed through the cross-section of the base. As the bias is increased in such a sense to draw the current toward the outer ring, less and less current flows in the neighborhood of the center base signal electrode. Finally the bias can be increased so that the current near this electrode is vanishingly small and this signal input is cut off. A characteristic similar to a remote gm characteristic in a vacuum tube is thus obtained in this transistor.

If the device is to be operated as a pentode with the two sections 17 and 18 unconnected, two of the base contacts may be used for ordinary or improved tetrode action and the third base contact can be used for modulation or for automatic gain control.

The above description of the invention is presented to give a specific embodiment thereof. It is contemplated that the unit could be of a square or any other cross section besides the preferred circular cross section. Also, the center base contact wire could pass through a thin collector layer of the transistor instead of the emitter layer. If the device is to be operated solely as a tetrode then the two outer ring semi-circular sections can be formed into one continuous ring. These and numerous other modifications can be made to the device without departing from the spirit and scope of the invention which is to be limited only as defined in the appended claims.

What is claimed is:

1. A transistor comprising first and second semi-conductor layers, a third layer sandwiched between said first and second layers, a conducting means surrounding said third layer and making ohmic contact therewith around the periphery of said third layer, a second conducting means passing through said first layer to make ohmic contact with said third layer.

2. A transistor as recited in claim 1 wherein said second conducting means makes ohmic contact with the center of said third layer.

3. A transistor as recited in claim 1 wherein said first conducting means is split into two sections, one on each side of said layer.

4. A transistor as recited in claim 1 wherein heat dissipating fins are provided on said surrounding conducting means.

5. A transistor as recited in claim 1 wherein said second conducting means passes through said third layer making ohmic contact therewith throughout the said third layer section.

6. A transistor as recited in claim 5 wherein said second conducting means makes only rectifying contact with said first and second layers.

7. A transistor as recited in claim 1 wherein said second conducting means makes only rectifying contact with said first layer.

8. A transistor as recited in claim 1 wherein there is provided a third conducting means making ohmic contact with said first layer and fourth conducting means making ohmic contact with said second layer.

References Cited in the file of this patent

UNITED STATES PATENTS

| | | |
|---|---|---|
| 2,770,761 | Pfann | Nov. 13, 1956 |
| 2,792,539 | Lehovec | May 14, 1957 |
| 2,794,846 | Fuller | June 4, 1957 |
| 2,842,668 | Rutz | July 8, 1958 |